(No Model.)
W. B. GRIFFITHS.
DEVICE FOR LAYING OFF GEOMETRIC FIGURES.
No. 364,508. Patented June 7, 1887.
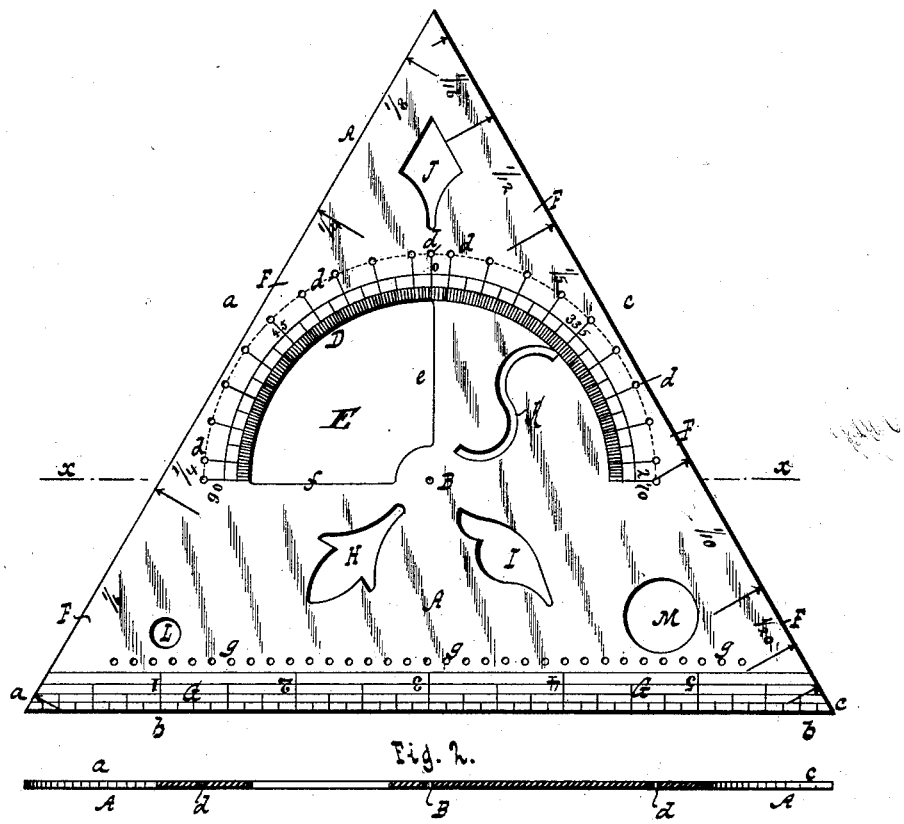
Fig. 1.
Fig. 2.
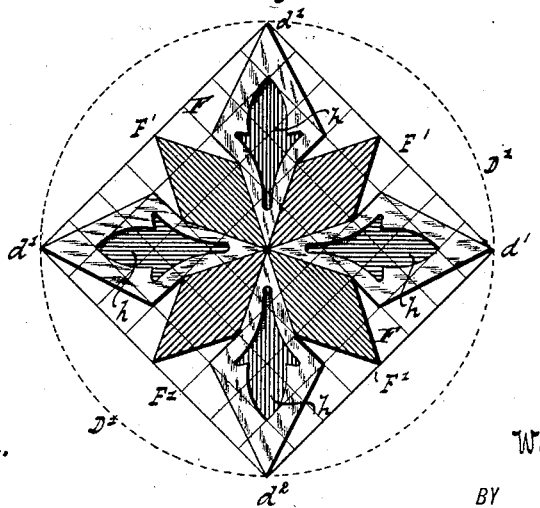
Fig. 3.
WITNESSES:
INVENTOR
Walter B. Griffiths.
BY
Van Santvoord & Hauff
his ATTORNEYS

UNITED STATES PATENT OFFICE.

WALTER B. GRIFFITHS, OF NEW YORK, N. Y.

DEVICE FOR LAYING OFF GEOMETRIC FIGURES.

SPECIFICATION forming part of Letters Patent No. 364,508, dated June 7, 1887.

Application filed February 26, 1887. Serial No. 228,986. (No model.)

*To all whom it may concern:*

Be it known that I, WALTER B. GRIFFITHS, a subject of the Queen of Great Britain, residing at New York, in the county and State of New York, have invented new and useful Improvements in Devices for Laying Off Geometric Figures, of which the following is a specification.

My invention consists in a device for laying off geometric figures—such as circles and polygons—and also for the production of various ornamental designs. The said device being complete in itself, the use of dividers and other drawing-instruments can be dispensed with. It is intended as an aid in drawing, and also for the instruction of children in the preliminary steps of drawing.

The novel features of my invention are fully pointed out in the following specification and claim, and illustrated in the accompanying drawings, in which—

Figure 1 represents a face view of a device embodying my invention. Fig. 2 is a section thereof in the plane $x$ $x$, Fig. 1. Fig. 3 is a face view of a design produced with the aid of the said device.

Similar letters indicate corresponding parts.

In the drawings, the letter A designates a polygonal disk, which can be in the form of a triangle, preferably equilateral, as shown in this example, or it may be in the form of a square or other polygon. Within the body of the disk is a hole or perforation, B, which is sufficiently large to receive a pin, about which, as a center, the disk can be rotated. With this hole or perforation B as a center is cut a protractor, D, and the material forming one quadrant of the protractor is cut away to form an opening, E, in order that the degrees can be transferred upon the sheet to be drawn upon. In the outer circle of the protractor D (shown by dotted lines in Fig. 1) are arranged a series of equidistant perforations or holes, $d$, through which the pencil-point can pass. By inserting the pencil-point through any one of said holes and rotating the disk a circle, as D', Fig. 3, of a determined diameter can be drawn, which can be divided into any number of equal parts by passing the pencil-point through selected equidistant holes or perforations $d$. The holes or perforations $d$ at the 0°, 90°, and 270° points also serve to form an exact square, as F in Fig. 3—as, for instance, by marking the said three points on the paper, as at $d'$, Fig. 3, and then rotating the disk A through one quadrant—that is, until the perforation at the 0° point reaches the 90° point—the fourth point, $d^2$, Fig. 3, of the square can be marked off. The sides of the square are drawn in by the use of any of the sides $a$ $b$ $c$ of the disk A as a rule.

To draw any number of concentric circles from the center B, a row of holes or perforations, $g$, is provided, which are tangent to an arc described from the center B, and can extend parallel to one of the sides of the disk—for instance, to the base $b$ thereof. By means of the row of perforations circles of any size within limits can be drawn, also concentric circles arranged at equal distance apart. These perforations $g$ can be used also for dividing a line into an equal number of parts by passing the pencil-point through equidistant perforations.

To draw polygonal figures, I mark out upon the sides $a$ and $c$ of the disk lengths F, corresponding to the chords subtended by definite varying arcs of the circle marked by the holes or perforations $d$. By first drawing the circle any polygon can be laid out by applying the said lengths F to the circle, making the points, and then drawing in the chords, as F' in Fig. 3. The base $b$ of its triangular disk is provided with a scale, as G, Fig. 1, which is convenient for measuring purposes and for dividing lines into equal parts. In the body of the disk openings are cut to form ornamental designs, such as H, I, J, and K, and also circles of varying sizes, such as L and M. By running the point of a pencil along the edges of any one of these designs the same can be copied on paper. In Fig. 3 the design H has been copied several times, said designs being arranged about a common center. This is accomplished by turning the disk through a definite angle after each time that the design is copied—for instance, through an angle of ninety degrees.

The design shown in Fig. 3 is completed by applying the scale G to divide the square into equal parts and then connecting the intersections of the dividing-lines, as shown.

What I claim as new, and desire to secure by Letters Patent, is—

A polygonal disk containing a center and a series of perforations arranged in an arc about said center, in combination with subtending chords marked on a side or sides of the disk, substantially as shown and described.

In testimony whereof I have hereunto set my hand and seal in the presence of two subscribing witnesses.

WALTER B. GRIFFITHS. [L. S.]

Witnesses:
A. FABER DU FAUR, Jr.,
E. F. KASTENHUBER.